UNITED STATES PATENT OFFICE.

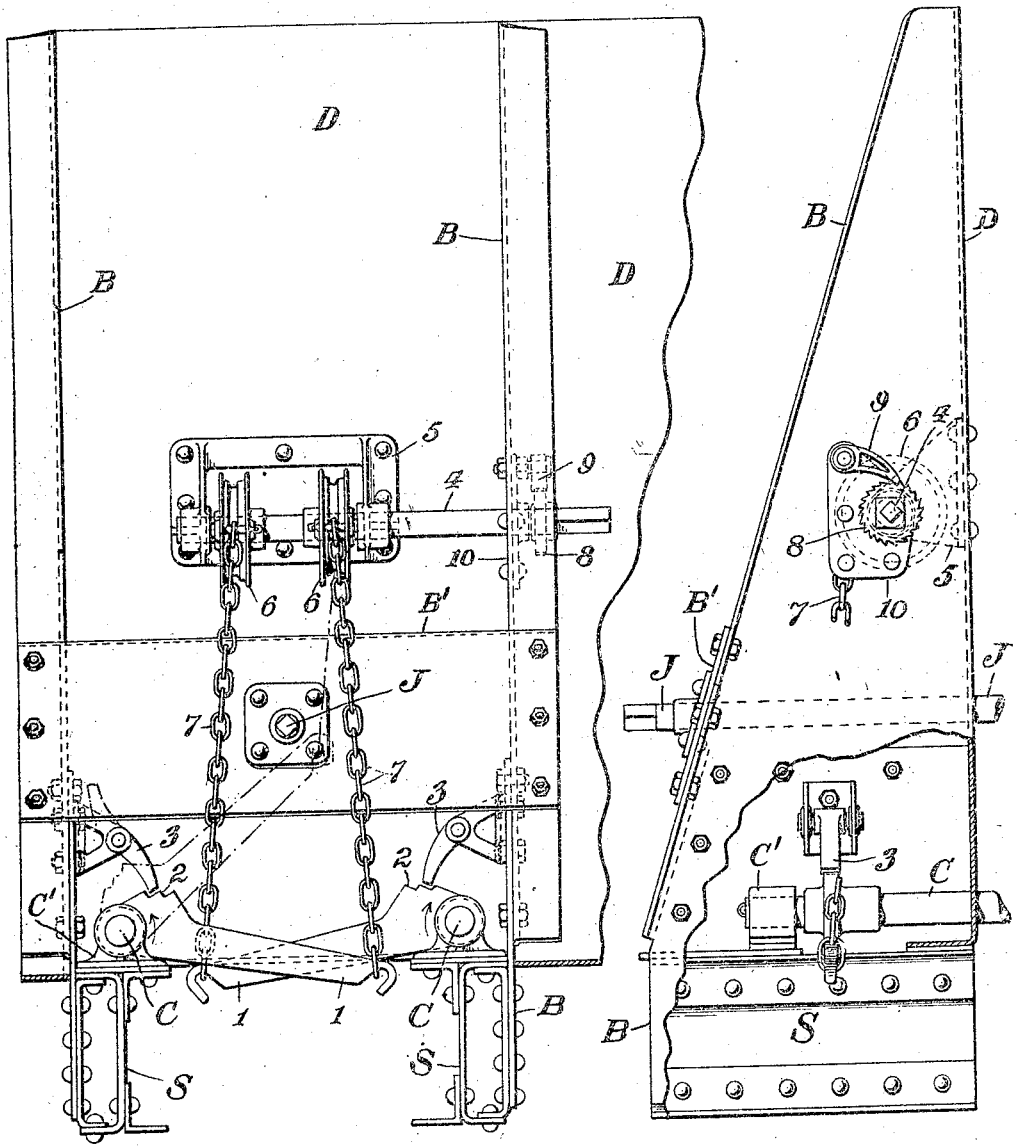

JOHN M. GOODWIN, OF MOUNT VERNON, NEW YORK.

VALVE-RELEASING MEANS FOR DUMPING-VEHICLES.

No. 917,287.  Specification of Letters Patent.  Patented April 6, 1909.

Application filed July 26, 1906. Serial No. 327,799.

*To all whom it may concern:*

Be it known that I, JOHN M. GOODWIN, a citizen of the United States, residing at Mount Vernon, county of Westchester, and State of New York, have invented certain new and useful Improvements in Valve-Releasing Means for Dumping-Vehicles, of which the following, taken in conjunction with the accompanying drawings, is a full, true, and concise specification.

My invention relates to dumping vehicles and more especially to the valve releasing means thereof, and consists of a simple and inexpensive arrangement of parts whereby either or both of two valve releasing shafts may be tripped or operated, all as will be hereinafter fully described and more particularly pointed out in the accompanying claims.

In the drawings forming a part hereof—Figure 1 is an elevation of valve releasing means embodying my invention, showing also a portion of the end bulkhead of a cargo receptacle broken away; and Fig. 2 is a side elevation of Fig. 1 with parts of the bulkhead reinforcing brace broken away.

The invention is more especially intended for use on dumping vehicles of the Goodwin type which, as is well known, have two valve releasing shafts C, C, extending longitudinally beneath the dumping valves (not shown) and also a central valve-replacing shaft J. As the construction of the valves and the operating means of Goodwin dumping cars is well known to those familiar in this art, and constitute no part of the present invention, there will be no need of describing the same in connection herewith. It will be understood, however, that the rotation of either of the shafts C, C, in the direction of the arrows suffices to release the supports from the dumping valves to dump the receptacle on one or the other, or both sides, and also that the shaft lettered J, slightly above the level of the valve-releasing shafts C, C, is the valve replacing shaft of usual function. The present invention relates to the means whereby either or both of the shafts C, C, may be rocked at pleasure.

The end bulkhead or end wall of the cargo receptacle is represented by the reference character D and is braced from the center sills S by means of an angle reinforcement consisting of two upright plates B B which maintain the said end bulkhead rigidly in upright position. The two plates B B are bound together by means of a cross-plate B' which also constitutes the end journal for the replacing shaft J.

The ends of the valve-releasing shafts C C are located between the two reinforcing plates B, being steadied in the journal boxes C', and have secured rigidly to them operating levers 1, 1, which extend toward and across each other as clearly indicated in Fig. 1. On the hubs of these levers, or, if desired, on any other convenient part formed on or attached to the ends of the shaft C there are provided one or more detent shoulders 2, 2, with which the pivoted detents 3, 3, are adapted to engage when it is desired that the shafts be not moved from a given or normal position. These detents 3, 3 are mounted on short brackets carried by the reinforcing plates B, B and may be swung upwardly to an inoperative position as indicated by the dotted lines on the left hand side of Fig. 1. I prefer to form the detent shoulders just mentioned upon the hubs of the operating levers 1, 1. Above the valve-replacing shaft J and secured to the bulkhead D between the plates B, there is mounted a hoisting device which consists of a horizontal winding shaft 4 journaled in a bracket 5 and carrying, in the present instance, two chain-drums 6, 6, the said drums being respectively located slightly to one side of a vertical line drawn through the replacing shaft J, so that the chains or other flexible connections 7 attached to said drums may be connected with the free ends of the operating levers 1, 1, on opposite sides of said shaft. The winding shaft 4 has a squared end which protrudes through an aperture in one of the upright plates B, at which point it carries a ratchet wheel 8, and a pawl 9 pivotally mounted on the plate B is adapted to engage the ratchet to lock the shafts against reverse rotation. The protruding end of the shaft 4, is also journaled in the plate B by means of the plate 10 attached thereto, as indicated, and the pawl 9 is preferably mounted on the latter plate.

The ends of the chains 7, 7, are adapted to be hooked over or attached to the free ends of the operating levers above referred to, so that when the hoisting device is revolved the levers may be lifted and the shaft C C thereby rotated so as to release the valves in well understood manner. The attachment of the chain to the lever by merely hooking the end link over the end of the lever as above described, affords a detachable connection for the said parts which can be quickly and expeditiously operated and which can be accomplished by one hand, this being an important feature of the device, inasmuch as the valves are frequently required to be released while the train is under way and on rough construction track. The operator can hold on with one hand and make all necessary adjustments with the other. Means are also provided whereby the chain, when connected to the free end of a lever, is prevented from slipping thereon. In the present drawings this function is performed by a recess in the end of each lever into which the end of the chain is hooked. By connecting only one of the chains with one of the arms it is possible to operate one shaft in exclusion of the other.

It will be understood that instead of two winding drums, one of greater length may be used, or a single drum and a chain having branch chains at the end, may be employed, each branch chain being adapted for attachment respectively to the operating levers, one of the essential features of my invention being the employment of flexible detachable means for rocking the shafts in the combination above described.

Having described my invention, what I claim and desire to secure by United States Letters Patent is 1. In a valved dumping receptacle, the combination of two valve-releasing shafts, operating levers therefor provided with recesses at their free ends, a hoisting mechanism and flexible connections connected therewith adapted to be hooked into said recesses, whereby said shafts may be operated to release the valves.

2. In a valved dumping receptacle, two valve-releasing shafts having operating levers therefor, in combination with a hoisting device and flexible connections therefor adapted to be hooked over the free ends of said levers and means on said levers for retaining said connections in said position thereon.

3. In a valved dumping vehicle, a valve-releasing shaft having an operating lever located outside of the end bulkhead thereof, in combination with an angle reinforcement for said bulkhead comprising two upright plates, a winding shaft and a winding drum therefor located between said plates and a flexible connection on said drum adapted to be attached to said operating lever, whereby to rock said shaft.

4. In a valved dumping vehicle, the combination of valve-releasing shafts and operating levers therefor, of a bulkhead-angle reinforcement consisting of two upright plates a bracket secured to the bulkhead between said plates, a winding shaft journaled in said bracket, and flexible connections connected to said shaft adapted to be attached to said levers.

5. In a valved dumping vehicle, the combination of an end bulkhead, a reinforcement therefor comprising two upright plates, two valve-releasing shafts having operating levers located between said plates, detent shoulders on said shafts and detents pivoted on said plates adapted to engage said shoulders.

6. In a valved dumping vehicle having a central valve-replacing shaft, two valve-releasing shafts having operating levers extending toward and crossing each other, in combination with a hoisting device located above said central shaft and two flexible connecting means adapted to connect the said hoisting device to the free ends of said levers on opposite sides of said central shaft.

In testimony whereof, I have signed my name to the specification in the presence of two subscribing witnesses.

JOHN M. GOODWIN.

Witnesses:
G. A. TAYLER,
H. G. KIMBALL.